United States Patent [19]
Doolittle

[11] 3,832,039
[45] Aug. 27, 1974

[54] MIRROR HAVING VARIABLE CONVEX LOWER PORTION

[75] Inventor: Milton A. Doolittle, Simsbury, Conn.
[73] Assignee: Select-A-Size Ltd., Syracuse, N.Y.
[22] Filed: Apr. 13, 1973
[21] Appl. No.: 351,045

[52] U.S. Cl. .................... 350/295, 350/288, 272/11
[51] Int. Cl. ............................................. G02b 5/10
[58] Field of Search ........... 350/288, 293, 294, 295; 272/11–13

[56] References Cited
UNITED STATES PATENTS

| | | | |
|---|---|---|---|
| 840,084 | 1/1907 | Muller | 350/295 |
| 3,004,472 | 10/1961 | Buxton | 350/295 |
| 3,445,157 | 5/1969 | Zitter | 350/295 |

*Primary Examiner*—Ronald L. Wibert
*Assistant Examiner*—Michael J. Tokar
*Attorney, Agent, or Firm*—Irvin A. Lavine

[57] ABSTRACT

A mirror for providing an image representative of a person after a loss of weight. The upper portion of the mirror which reflects the head of a person remains planar, while the lower portion which reflects the body is variably curved. The mirror is provided with an adjustable support so that the planar upper portion may be moved vertically to accommodate persons of different heights.

19 Claims, 5 Drawing Figures

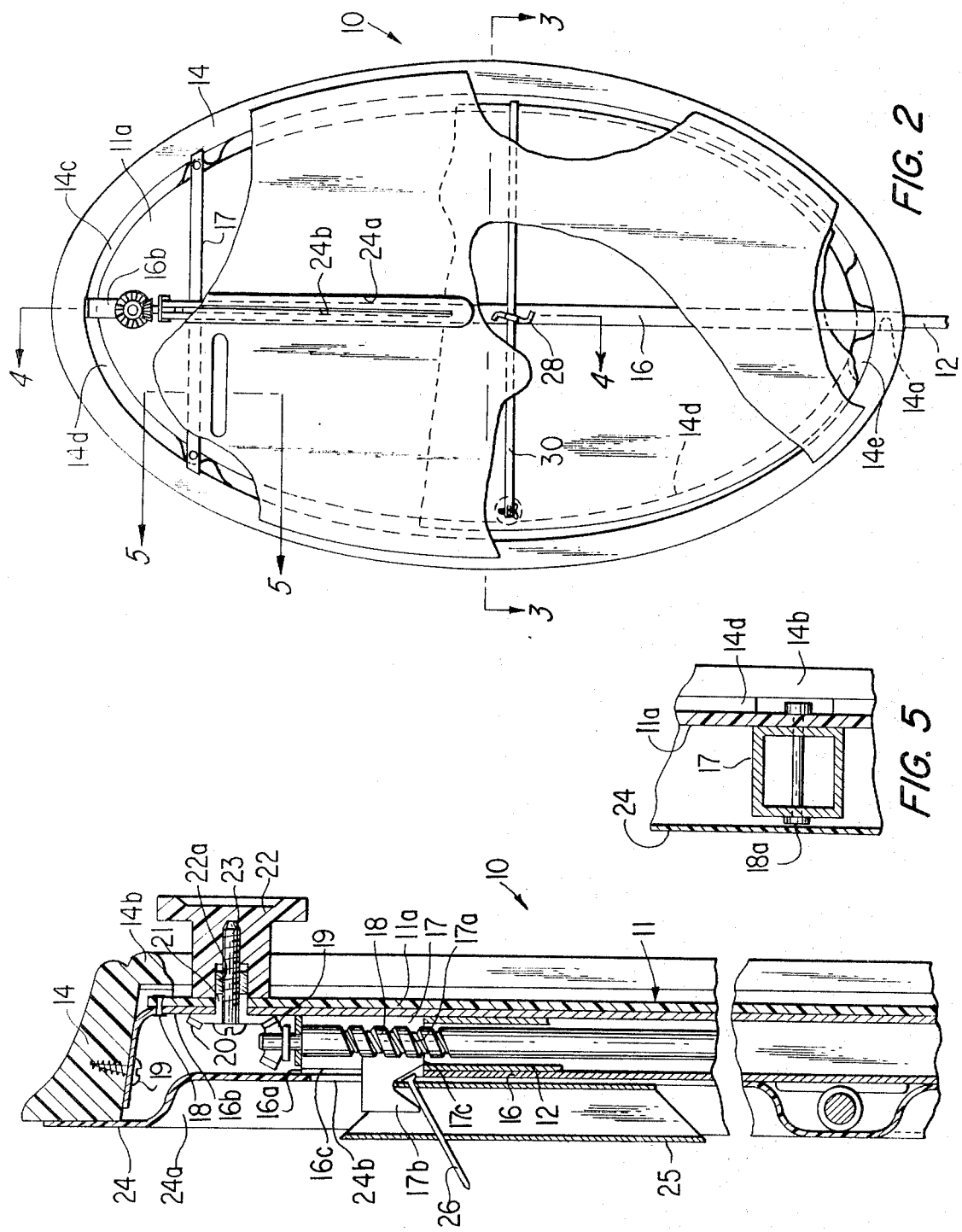

MIRROR HAVING VARIABLE CONVEX LOWER PORTION

BACKGROUND OF THE INVENTION

The present invention relates to a mirror having a reflecting surface with a curvature which may be varied.

Mirrors have been provided of fixed, planar configuration, which give a relatively true reflected image of an object. Other mirrors have been provided which are curved, either convex or concave. Further, it is known that mirrors have been provided which are curved and which include means for varying the degree of curvature.

More particularly, it has been proposed to provide a mirror of generally rectangular configuration, convex about a vertical axis, and with a mechanism including a worm and gear for varying the position of a longitudinally extending roller engaging the rear of the reflecting surface of the mirror, to thereby provide various convex curvatures of the mirror, from its top to its bottom. This mirror apparatus was provided in order to make it possible for a person looking at himself in the mirror to see visually how he will look after he has lost a selected amount of weight. Such a mirror was intended to be used to induce a person to lose weight by showing the person his appearance after a weight loss of a selected or given amount or amounts. This mirror apparatus, however, was deficient in that it gave an image of a person's weight loss over both the body and the head, or face, of the person. Thus, a person who was significantly over-weight received an image, with this prior art mirror apparatus, which showed a decrease in the width of his body, with a corresponding decrease in the width of his head. In many instances, this gives a false or misleading appearance, because the decrease in the face dimensions, with weight loss is usually far less than the decrease in dimensions of the body, with significant weight loss.

It has also previously been proposed to provide a mirror having some portions fixed, so as to remain in planar condition, while other portions were flexible, and connected with some apparatus to move the flexible portions. In particular, a flexible mirror with individually flexible portions has been provided, intended to permit an individual to distort, correct, enlarge or diminish his own facial features or body parts or that of others, in whole or in part, for amusement or other purposes. This mirror apparatus was particularly directed to enable the reconstruction, from description, of the facial features of a person, as is frequently required in police work. This construction provided a reflector mounted by a central point, preferably at its exact center, on a stud, the marginal portions of the reflector having a multiplicity of rods connected to them, with a mechanism provided for moving the rods so as to selectively move one or more of the marginal portions so that they became selectively convex or concave. This flexible mirror apparatus, while having a fixed, planar portion and variable curvature marginal portions was not adaptable for providing a relatively true image of a person after significant weight loss.

SUMMARY OF THE INVENTION

The present invention provides a mirror having a generally longitudinally extending reflector having a substantially planar upper portion, and a second portion below the first portion which second portion is flexible, together with a mechanism for varying the curvature of the flexible second portion, particularly to different amounts of curvature about a longitudinally extending axis. At the rear of the reflector, there is a longitudinally extending hollow support tube, and a cross tube secured to the longitudinally extending support tube near the upper end thereof, with the upper portion of the reflector having its rear surface engaging and supported by the cross tube and upper end of the support tube. The support tube is hollow, and its lower end is open and unobstructed. Within the support tube is a blocklike support element which is internally threaded, a screw extending in threaded engagement through it, and having a bevel gear at its upper end. A second bevel gear extends through the reflector, and has a control knob secured to it, the control knob being forwardly of the reflector, so that it is it accessible from the front of the mirror for rotation of the bevel gears and vertical movement of the support element. The hollow tube has a slot extending vertically at the rear thereof, and a hook extends from the support element through this slot. A cover is provided for the back of the mirror, the cover preferably being of formed plastic sheet material, and having a longitudinally extending depression therein, with a slot in the forward-most part of the depression, registering with the slot in the support tube, so that the hook also extends through the slot in the back cover. A support bracket, conforming in shape to the depression in the cover may be secured to a wall, with the hook engaging the bracket. Alternatively, a support post may extend upwardly through the hollow support tube, the post having suitable legs for supporting it on a floor surface, and the upper end of the post engaging the bottom of the block-like support element, to thereby provide an alternative floor support for the mirror.

Downwardly of the transverse tube is a transverse lever, supported near its mid-point from the support tube, and having one end forwardly curved, with a transverse slot therein, in which is an edge of the second portion of the reflector. Connected to the opposite end of the lever is a screw, which extends through an opening in the reflector. A nut apparatus is threaded on the screw, engaging the reflector, and including a control knob forwardly of the reflector, so that by rotation of the control knob, the reflector may be bowed convexly in varying amounts. The control knob has an open-ended bore through which the screw may protrude, to provide an indication of the amount of curvature of the mirror, and therefore of the weight loss at a particular setting of the mirror curvature adjusting mechanism: the planar upper portion of the reflector being at all times non-curved.

The lower portion may also be bowed concavely to simulate weight gain.

An object of the present invention is to provide a mirror which will give a true representation of a person's appearance after varying amounts of weight loss or gain.

Another object of the present invention is the provision of a mirror having an upper, planar part for giving a true reflection of a person's face, and a lower part of variable curvature, for giving a representation of a person's body, after weight loss or gain.

Another object of the present invention is the provision of a mirror which may be vertically adjusted, so as to bring a fixed, planar portion thereof into registry with persons of varying height.

Another object of the present invention is the provision of a mirror which may be supported by either a wall mounting, or a floor mounting, and further to provide such a mirror which may be vertically adjusted, with either mounting.

Yet another object of the present invention is to provide a mirror having controls accessible from the front thereof for adjusting the mirror vertically, and for adjusting the curvature of the mirror portion which can be varied.

Other objects of the present invention will be readily understood from a consideration of the following description, drawings and claims.

BRIEF DESCRIPTION OF THE DRAWING

FIG. 2 is an elevational view, with parts broken away, of the mirror of FIG. 1, viewed from the rear.

FIG. 4 is a cross sectional view taken on the line 4—4 of FIG. 2.

FIG. 5 is a cross sectional view taken on the line 5—5 of FIG. 2.

DESCRIPTION OF THE PREFERRED EMBODIMENT

Figure 1:
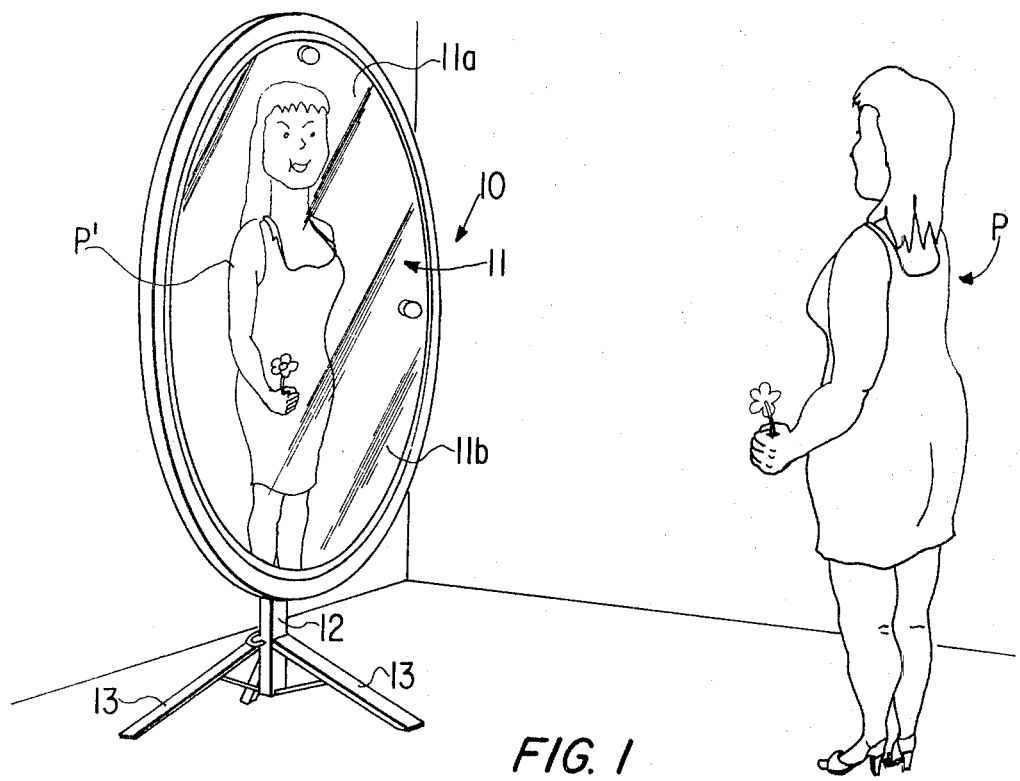
FIG. 1 is a perspective view of a mirror in accordance with the present invention with an over-weight person.

Referring now to the drawings, wherein like or corresponding reference numerals are used to designate like or corresponding parts throughout the several views, there is shown in FIG. 1 a mirror generally designated 10, in accordance with the present invention. Mirror 10 includes a reflector having an upper portion 11a and a lower portion 11b, the reflector itself being a unitary and integral flexible member and being generally designated 11. Preferably, the reflector 11 is a flexible plastic with a suitable reflecting layer, as is known in the art. Standing in front of the mirror 10 is a person P who is over-weight, by conventional standards. An image P' of the person P may be seen in the reflector 11, and it will be noted that there is a substantially true, non-distorted reflection of the face and head of the person P in the upper portion 11a of the reflector 11, while in the lower portion 11b of the reflector 11 there is a distorted, thinner image of the person P, and more particularly of the body of the person P. This is due to the fact that the lower portion 11b is convexly curved.

The mirror 10 is shown supported by a post 12, stabilized by legs 13.

Figure 3:
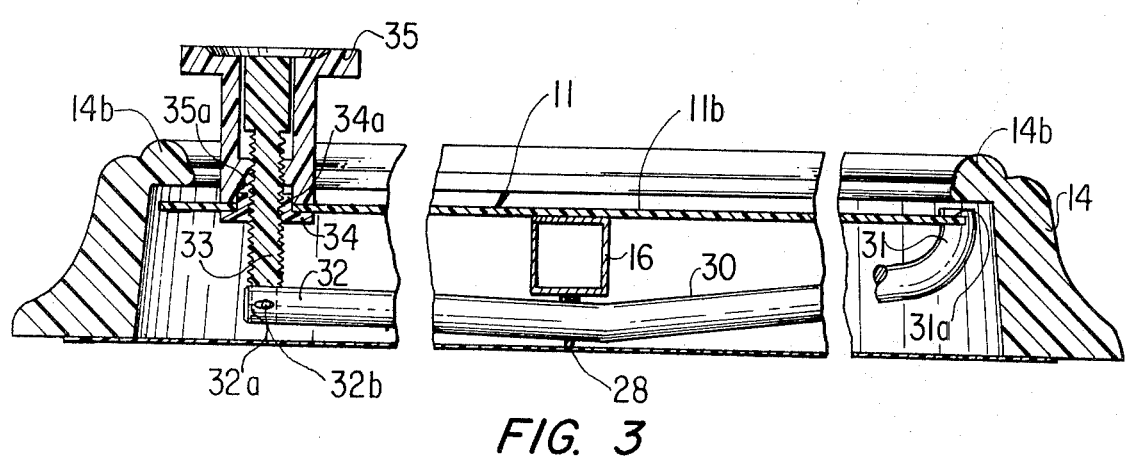
FIG. 3 is a cross sectional view taken on the line 3—3 of FIG. 2.

Referring now to FIG. 2, there is shown the mirror 10, the view being taken from the rear, with parts broken away. The mirror 10 is of generally oval configuration, but in any event is intended to be longitudinally extending, and to be supported in a generally vertical plane. The mirror 10 includes an encircling frame 14, preferably of molded plastic material. The frame 14 generally has the cross section shape as shown in FIGS. 3 and 4. A support structure is provided which includes a hollow support tube 16 which extends longitudinally, in a generally vertical direction, support tube 16 being of square cross section, as shown in FIG. 3. A transverse tube 17 is provided near the upper end of support tube 16, and the upper portion 11a of the reflector 11 is secured to the upper portion of the tube 16 and to the transverse tube 17, so that the rear face of reflector 11 is adjacent to the front faces of the tubes 16 and 17. As shown in FIG. 4, the upper end of support tube 16, designated 16a, is somewhat below the top of the reflector 11, but an integral plate 16b of support tube 16 extends beyond the end 16a and is secured to the reflector 11 by a rivet 18. The extension plate 16b is also secured to the frame 14, as by screw 19. Similar constructions are used to secure the reflector 11 to the tube 17 and the latter to the frame 14.

The tube 17 is essentially in two parts, secured to the tube 16 by suitable means, such as welding. The tubes 16 and 17 have the same cross sectional size and shape, and their front faces are coplanar. The lower end of the support tube 16 extends into an opening 14a at the lower end of the frame 14. The lower end of the support tube 16 is open, to thereby provide access so that the post 12 may be inserted thereinto.

Referring again to FIG. 4, it may be seen that the frame 14 has an inwardly extending lip 14b extending thereabout, the reflector 11 being of such size that it extends behind the lip 14b, as may be seen at the upper end of FIG. 4, and on FIG. 3.

The lip 14b adjacent the top portion thereof is provided with rearwardly extending pads 14c and 14d, and near the bottom portion with pad 14e. As shown in FIG. 5, the reflector upper portion 11a is in engagement with the rear surface of the pad 14d at the marginal portion thereof which lies behind the lip 14b. The transverse tube 17 is directly behind the reflector portion 11a, held in engagement with it by a rivet 18a and with the pads 14c and 14d so that there is thereby provided engaging support for the margin of the portion 11a of reflector 11 above the transverse tube 17. The top pad 14d is recessed as shown in FIG. 5 to accommodate a head of rivet 18a. Additionally, the pad 14e at the bottom of the frame 14 lies to either side of the support tube 16, and provides support for the lowermost marginal portion of the reflector 11. Intermediate the top pads 14c and 14d and bottom pad 14e, there is provided a clearance space, to permit movement of the marginal edges of the lower, curved portion 11b of reflector 11. This spacing may be seen in FIG. 3.

In order to adjust the height of the mirror 10, there is provided within the support tube 16 a movable, generally block-shaped support element 17, which is provided with an internal thread 17a, and which has an external size and shape substantially conforming to the internal size and shape of the hollow support tube 16, so that it may move freely, in a guided fashion, therewithin. The support element 17 has a rearwardly extending hook 17b, which is downwardly directed, and support element 17 is also provided with a generally planar bottom surface 17c. The hook 17 extends through a horizontally extending slot 16c located centrally in the rear plate of the square shaped hollow support tube 16.

For moving the support element 17, there is provided a screw 18 which is threadedly engaged in the threads 17a, and which extends upwardly beyond the top 16a of support tube 16, having a bevel gear 19 secured to it. A second bevel gear 20 meshes with the gear 19, gear 20 having an extension 21 which passes through openings in the plate 16b and reflector 11, and into a bore 22a of a control knob 22. The screw 23 holds the gear 20 to the control knob 22, preferably the extension 21 having a non-circular cross section shape which mates with a corresponding cross sectional shape of the bore 22a, to provide a driving connection between gear 20 and control knob 22. By this construction, rotational control knob 22 will effect movement of support element 17, up or down, within the support tube 16.

The bottom surface 17c may rest upon the upper end of the post 12, where the mirror 10 is floor-supported, or the hook 17b may engage a suitable wall-supported element, to be hereinafter described.

The mirror 10 includes a back cover 24, preferably formed of plastic sheet material to the desired size and shape. As shown in FIG. 2, the back cover 24 extends rearwardly of the frame 14, and may be secured thereto by suitable adhesive. The cover 24 is provided with a depression 24a, which is longitudinally extending, and which overlies and is directly rearwardly of the support tube 16. The depression 24a, as shown in FIGS. 2 and 4, has a longitudinally extending slot 24b which is in registry with the slot 16c in support tube 16, so that the hook 17c extends, also, through the slot 24b. A bracket 25 is shown in FIG. 4, having a nail 26 passing through it, so that it may be secured to a wall. The bracket 25 is in the depression 24, which thereby serves to provide a mounting guiding arrangement when the bracket 25 has been nailed to a wall, and the mirror 10 is being placed on it. As indicated in FIG. 4, the hook 17b engages the bracket 25, to thereby support the mirror, when a wall support is desired.

In order to vary the curvature of the reflector, there is shown in FIG. 3 the lower portion 11b of the reflector 11, the frame 14 forwardly of the reflector 11, and the hollow support tube 16 on which is a looped wire 28, having a transversely extending lever 30 passing through it, and supported by it. At one end, the lever 30 is curved forwardly, as shown at 31, and has a slot 31a therein, into which is inserted a marginal part of the reflector portion 11b. At its opposite end 32, the lever 30 is provided with a bore 32a into which there extends a screw 33, being connected to the lever 32 by a connecting pin 32b. A nut 34 is threaded on the screw 33, lying generally rearwardly of reflector 11, but having an extension 34a passing through an opening in the reflector 11. The extension 34a is of non-circular outer configuration, and is received in a correspondingly shaped bore 35a of a control knob 35, which is of generally annular configuration, and into which the screw 33 extends. The screw 33 is also in threaded engagement with the knob 35, and the forward end of the screw 33 may extend somewhat through the front of control knob 35, depending upon the position of screw 33 relative to knob 35.

By rotating the control knob 35 and the nut 34, the left edge of reflector 11 as viewed in FIG. 3, will have the distance between it and the end 32 of lever 30 decreased, and the end 31 of lever 30 will tend to rotate in a clockwise manner, as viewed in FIG. 3. Thereby, the lower portion 11b of the reflector 11 will be moved into various convex shapes, although it may also assume a planar condition, coplanar with the planar, fixed, upper portion 11a. The control knob 35 and nut 34 may also be rotated so as to cause the lower portion 11b of the reflector 11 to assume a concave shape.

There has been provided a mirror which will enable a person to have a true representation of his or her appearance after various weight losses, the portion of the reflector which reflects the body of the person being movable into various convex curvatures, while the upper portion of the reflector, which reflects the head of the person, will remain in a planar state, giving a true reflection. This is because the weight loss is much less pronounced on a person's head, than on a person's body. Of course, in some instances where a substantial weight loss and change in appearance of the face may be anticipated, the mirror may be adjusted so that the person's head will be reflected in the lower, convex portion of the reflector. Also, the reflector lower portion may be moved to a concave configuration, to indicate the person's appearance if weight is gained.

The mirror herein provided may be easily mounted on a wall, having a guide for mounting, and may also be mounted on a support post, and with either mounting arrangement, the height of the mirror may be readily adjusted by a control knob accessible from the front of the mirror. In addition, the herein disclosed mirror provides for convenient adjustment of a lower portion thereof into various curved shapes, from a convenient, front located control knob. The control knob itself has an inherent indicator of the amount of curvature, which can be readily converted into weight loss figures.

The reflector of the present invention mirror apparatus is supported by the frame over a substantial marginal portion at the top and bottom thereof, while being free of the frame at opposite margins located at the lower, movable portion.

It will be obvious to those skilled in the art that various changes may be made without departing from the spirit of the invention and therefore the invention is not limited to what is shown in the drawings and described in the specification but only as indicated in the appended claims.

I claim:

1. A mirror for providing a true reflection of a person's head and a thinner or fatter reflection of a person's body comprising.
   a. longitudinally extending reflecting means including a substantially planar first portion at one end thereof, and a second portion,
   b. means for supporting said mirror means with the first planar portion above the second portion,
   c. said second portion of said mirror means being flexible, and
   d. means for varying the curvature of said second portion only to different amounts about a longitudinally extending axis,
   e. said first portion remaining planar upon variation of the curvature of the second portion by said last mentioned means.

2. The mirror of claim 1, said first portion and said second portion of said reflecting means being integral.

3. The mirror of claim 1, said mirror supporting means further including means for adjusting the height thereof relative to a fixed support.

4. The mirror of claim 3, said last mentioned means comprising a support element, and means for moving said support element longitudinally.

5. The mirror of claim 4, said support element comprising threads, said last mentioned means comprising a screw threaded in said support element, and control means for rotating said screw.

6. The mirror of claim 5, said control means comprising a rotatable knob forwardly of said reflecting means.

7. The mirror of claim 4, said mirror comprising a longitudinally extending hollow support tube adjacent the rear of said reflecting means, said hollow tube having a longitudinally extending slot remote from said reflecting means, said support element being in said tube and having a hook extending therefrom through said slot.

8. The mirror of claim 7, said hollow tube having the lower end thereof open for reception of a support post.

9. The mirror of claim 7, and a support post extending upwardly into said hollow tube and having an upper end in egagement with said support element.

10. The mirror of claim 4, said mirror comprising a longitudinally extending hollow tube, said support element being in said tube, and said hollow tube having the lower end thereof open for reception of a support post.

11. The mirror of claim 10, and a support post extending upwardly into said hollow tube and having an upper end in engagement with said support element.

12. The mirror of claim 4, said support element having a hook extending therefrom rearwardly of said reflecting means, a rear cover rearwardly of said reflecting means and said support element, said rear cover having a longitudinally extending depression therein, and a longitudinal slot in said depression, said hook extending through said slot.

13. The mirror of claim 1, said means for varying the curvature of said mirror comprising a longitudinally extending support rearwardly of said reflecting means, a lever transversely of said support rearwardly of said support and of said second portion, means attaching one edge of said second portion to one end of said lever, and means connected to said second portion opposite edge and said lever opposite end for varying the distance therebetween.

14. The mirror of claim 13, said last mentioned means comprising a screw connected to said lever opposite end and nut means connected to said mirror.

15. The mirror of claim 14, said nut means comprising a knob forwardly of said reflecting means.

16. The mirror of claim 15, said knob being annular and having a passage extending therethrough, said screw extending in said passage.

17. The mirror of claim 1, said mirror comprising a peripherally extending frame, a longitudinally extending support tube, a transverse member adjacent the upper end of and secured to said support tube, means connecting said support tube and said transverse member to said frame, and means securing said reflecting means to said support tube and transverse member.

18. The mirror of claim 17, said frame having an inwardly directed lip, the marginal portion of said reflecting means lying rearwardly of said lip, and said lip having a rearwardly extending pad at the top thereof extending above said transverse member engaged by the marginal portion of said reflecting means.

19. The mirror of claim 18, and a further pad adjacent the lower end of said support tube engaged by the marginal portion of said reflecting means.

* * * * *